March 18, 1958 W. F. OCENASEK 2,827,085
BAND SAW GUIDES AND GUARDS
Original Filed Oct. 5, 1950 6 Sheets-Sheet 2
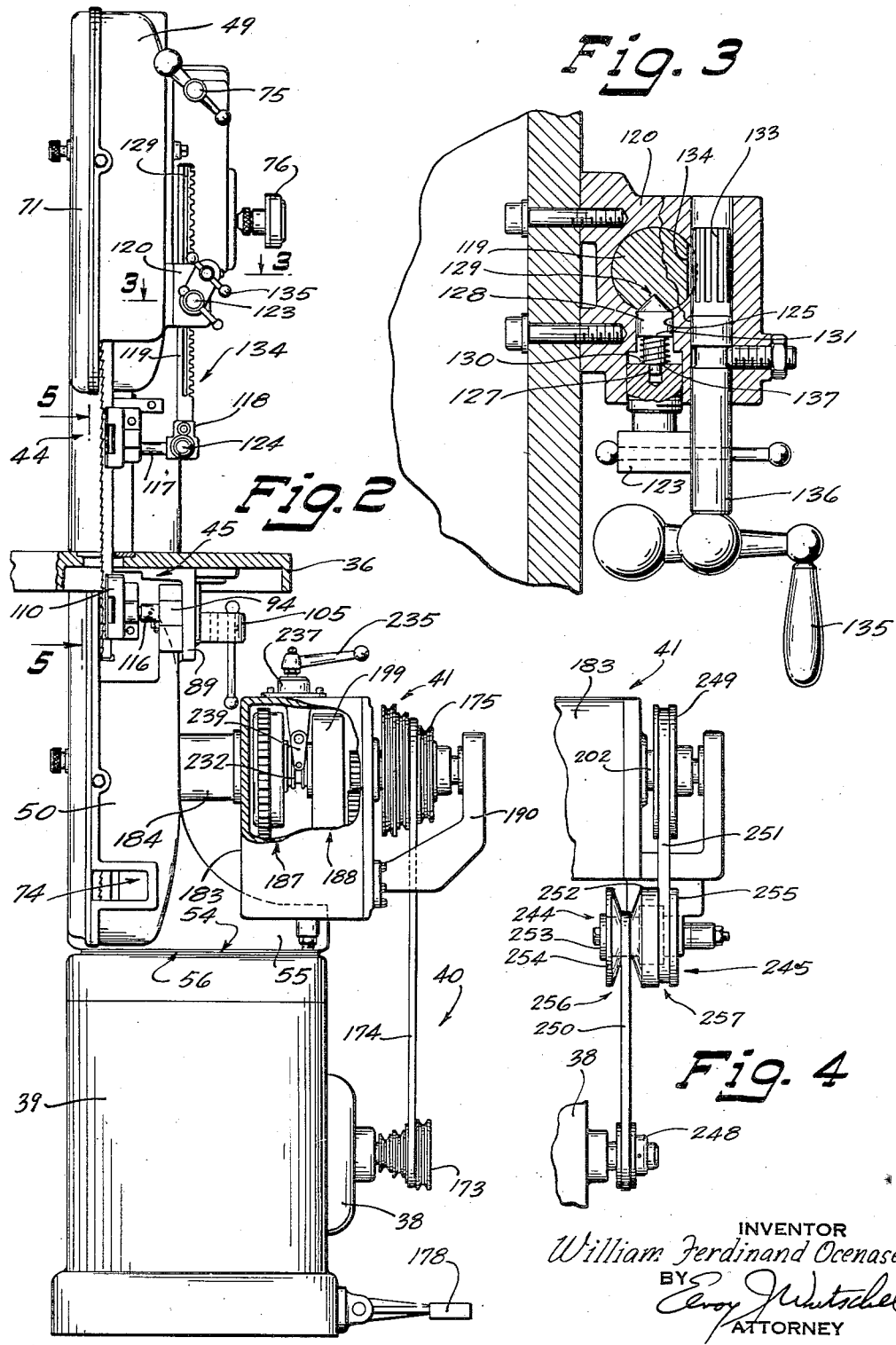
INVENTOR
William Ferdinand Ocenasek
BY
ATTORNEY

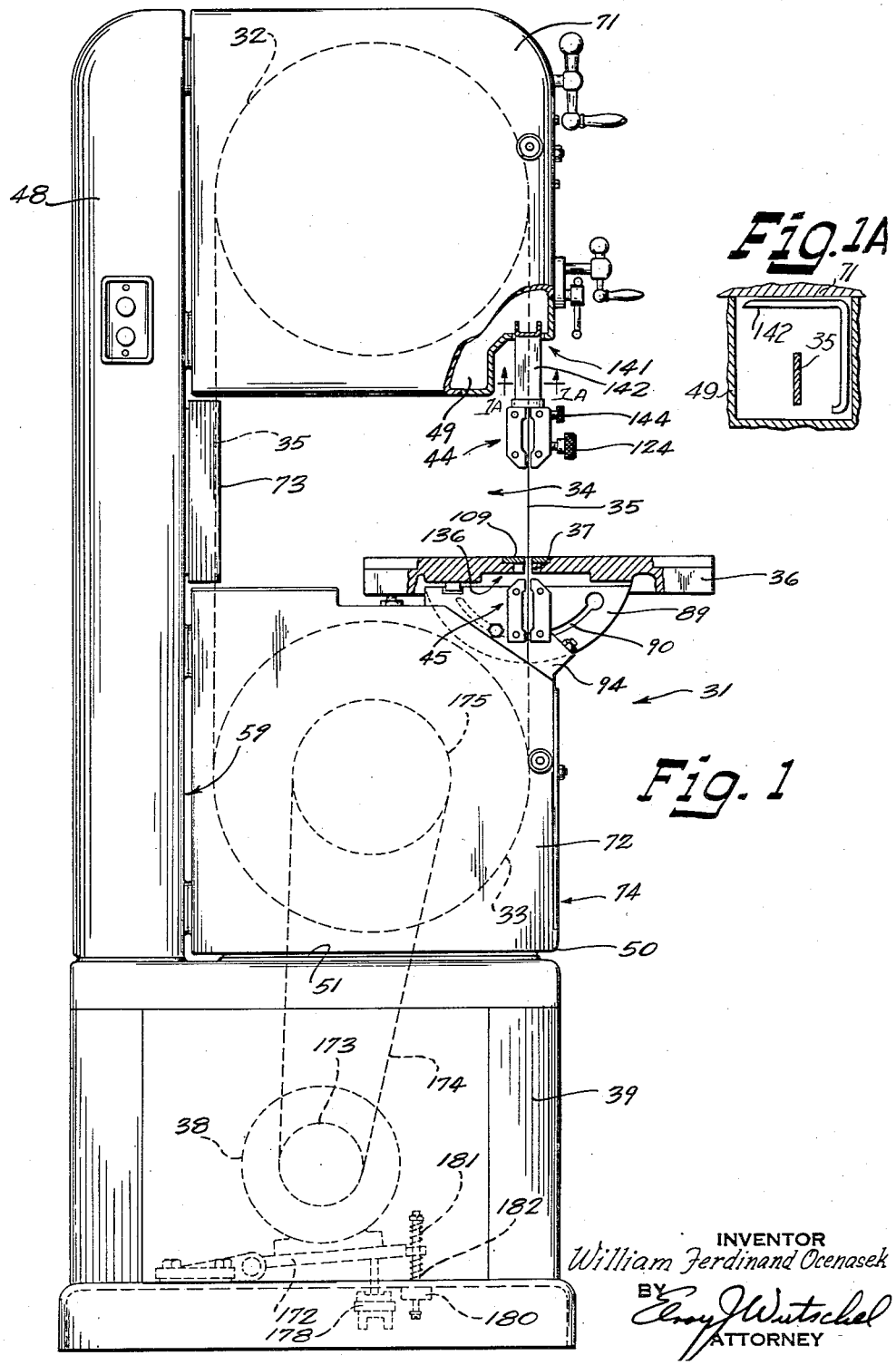

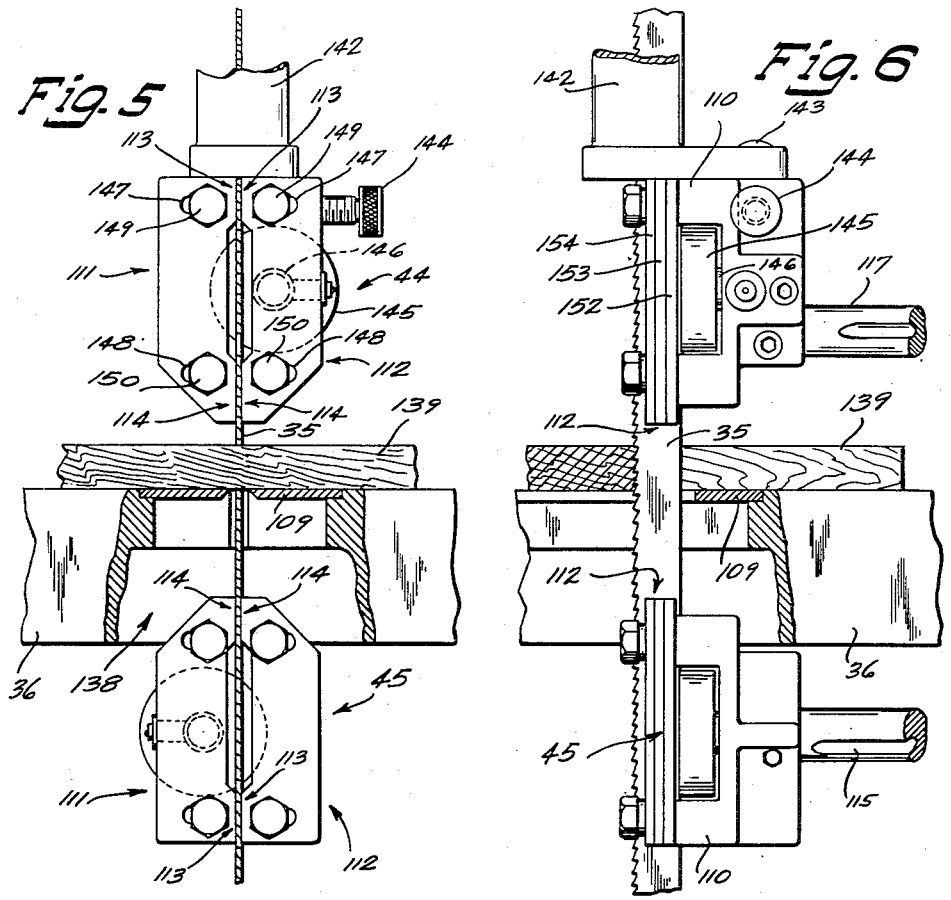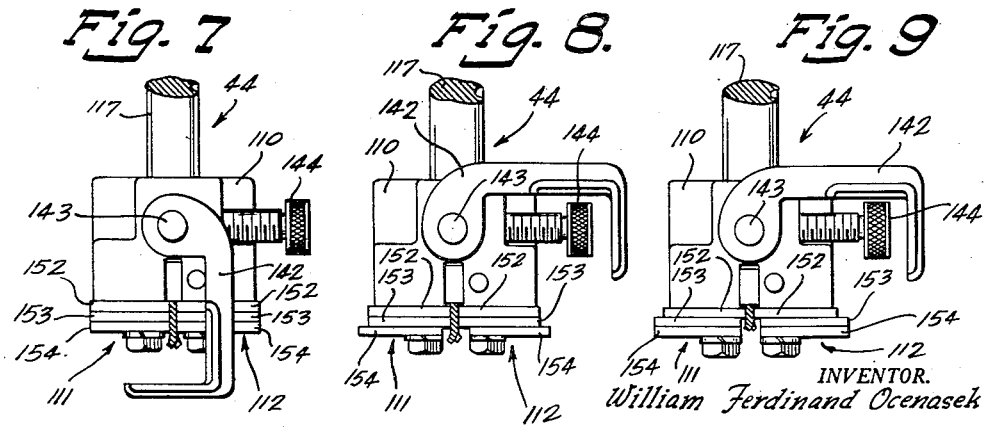

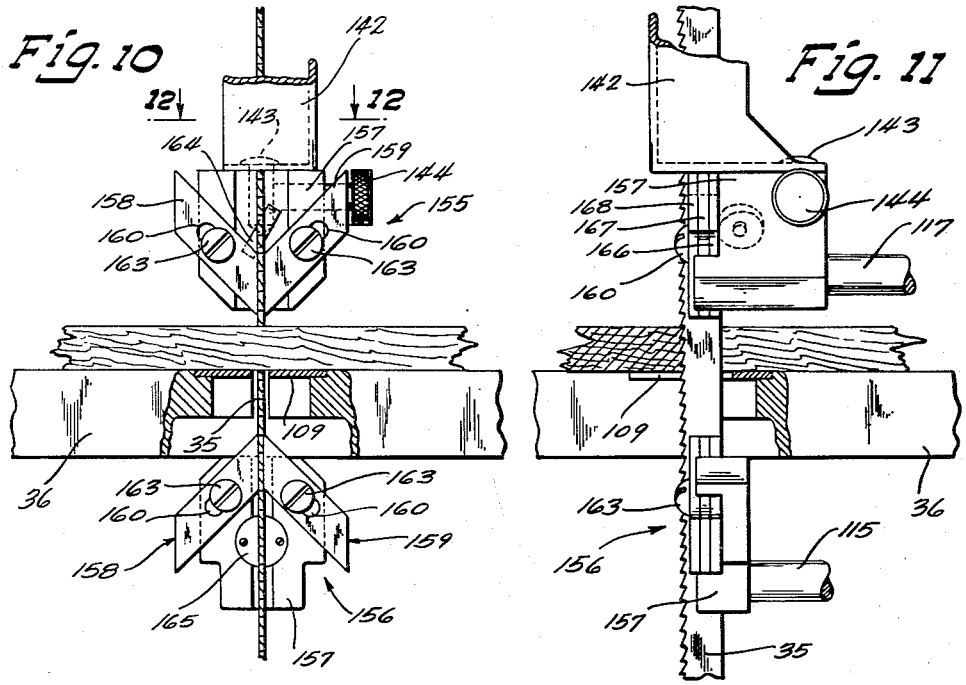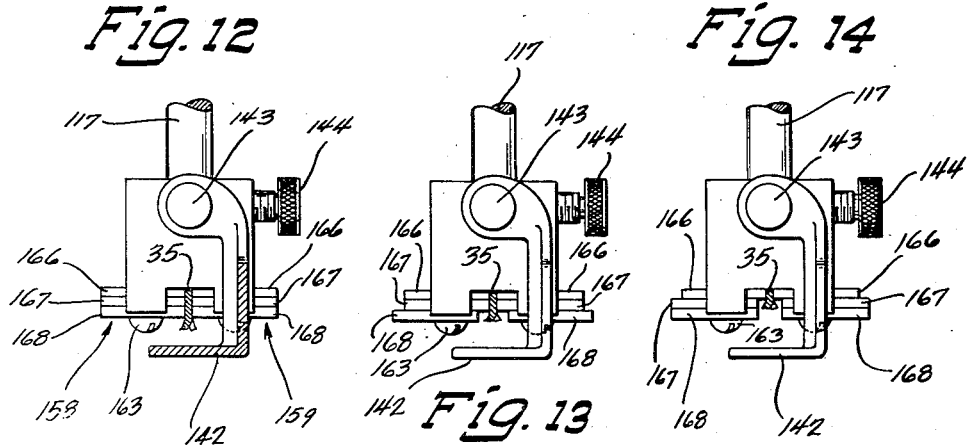

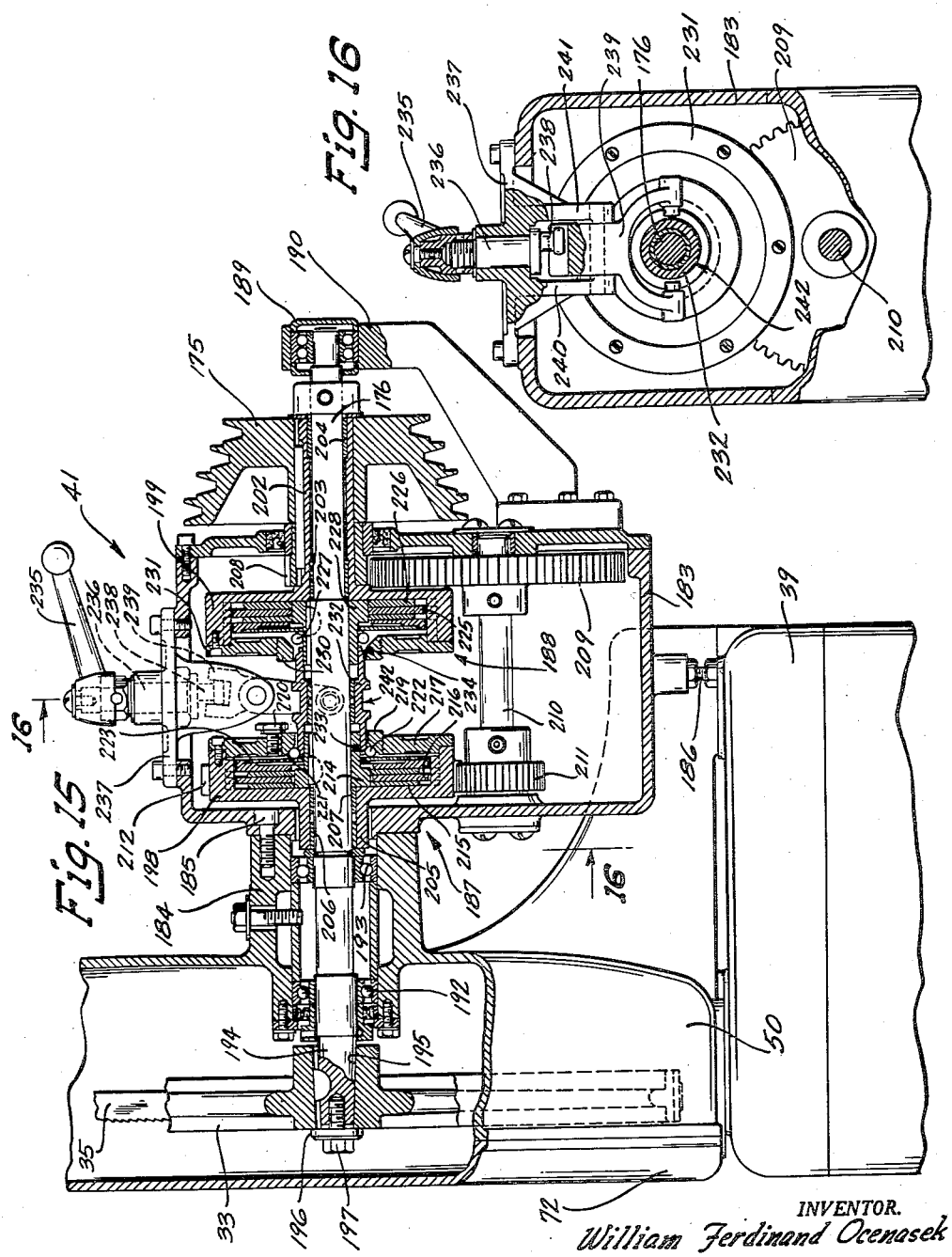

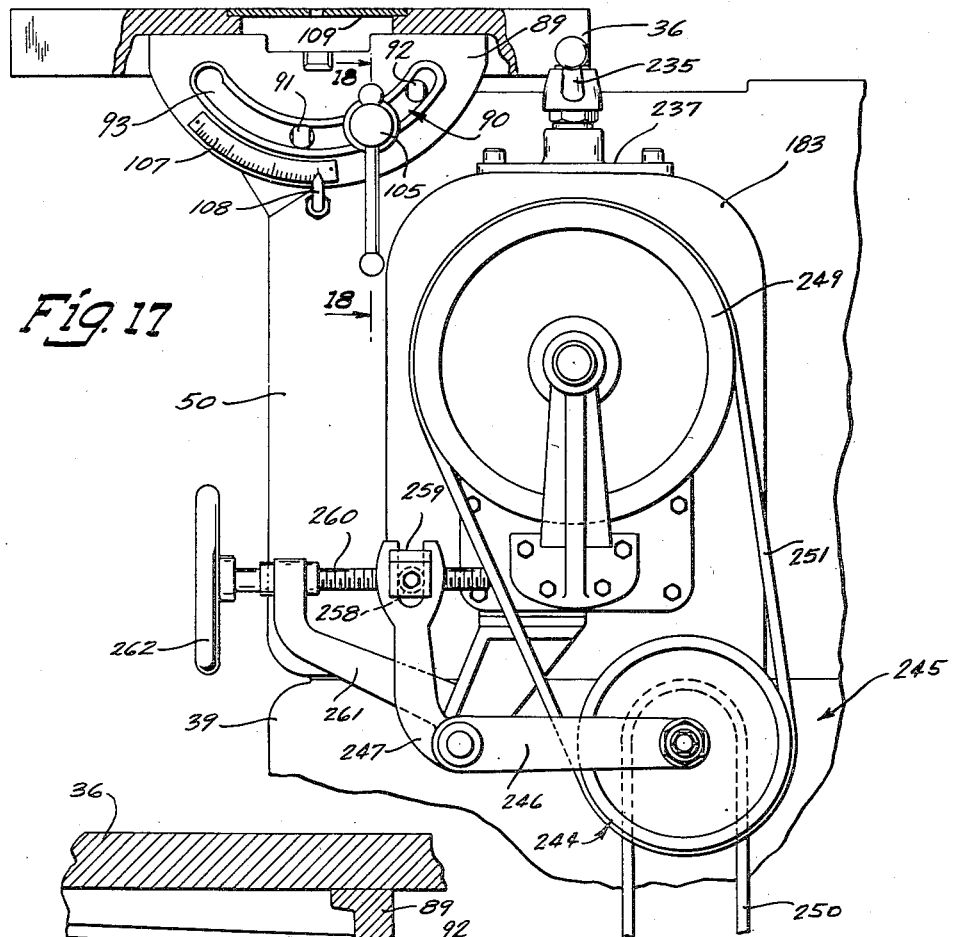
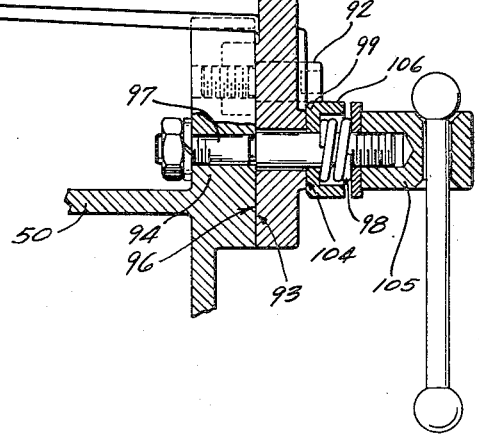
Fig. 17
Fig. 18

United States Patent Office 2,827,085
Patented Mar. 18, 1958

2,827,085

BAND SAW GUIDES AND GUARDS

William Ferdinand Ocenasek, South Plainfield, N. J., assignor, by mesne assignments, to Rockwell Manufacturing Company, a corporation of Pennsylvania Original application October 5, 1950, Serial No. 188,616. Divided and this application August 20, 1953, Serial No. 375,368

8 Claims. (Cl. 143—159)

This invention relates generally to improved means for controlling the operation of a continuous or endless saw band. More particularly to improvements in guides for band saw blades and to the protection afforded by the improved guides to the machine operator.

This application is a division of my application Serial No. 188,616 filed October 5, 1950, entitled Band Sawing Machine, issued November 30, 1954 as Patent No. 2,695,637.

A general object of the invention is to provide an improved band saw having greatly improved sawing accuracy and improved operating and safety characteristics for more conveniently performing a wide variety of sawing operations.

Another general object of the invention is to provide improved mechanism for guiding the band saw blade in combination with mechanism to afford band saw guards.

Another object is to provide an improved band saw with various component parts so arranged as to simplify the manufacture and reduce the cost of the improved mechanism.

Another object is to provide laminated guide members, for a band saw, so constructed and disposed as to be individually adjustable for guiding different sizes of saw bands, without the necessity of removing the guides from the machine.

Another object is to provide an improved saw band guide and guard having a thrust member positioned rearwardly of a pair of laminated guide members which are individually adjustable to accommodate different widths and thicknesses of saw bands.

Another object of the invention is to provide a guide and guard apparatus for a band saw machine, which is quickly and easily adjusted, toward or away from the workpiece.

Another object of the invention is to provide improved means for guiding and controlling the speed of operation of an endless saw band.

A further object of the invention is to provide improved supporting structure for a band saw in combination with improved mechanism for guiding and driving an endless saw band.

Another object of the invention is to provide an improved variable speed transmission mechanism that is operatively connected to drive the endless saw band of a band saw throughout a wide selection of speeds in a high or low range.

A further object of the invention is to provide improved means for pivotally supporting the work supporting table of a band saw including means for frictionally retaining the table in predetermined adjusted position.

A still further object of the invention is to provide an improved band sawing machine arranged to afford the greatest possible convenience and flexibility in performing a wide variety of sawing operations.

A further object of the invention is to provide a mechanism of this character which may be readily and cheaply manufactured, which is durable and efficient in service, and extremely simple to operate.

According to this invention, a band sawing machine is provided with a generally C-shaped supporting frame of an improved unit type construction that is disposed to support in vertically spaced relationship a pair of guiding wheels about which is trained a continuous or endless saw band. For guiding the saw band along a path of straight line movement, a pair of individually adjustable laminated saw guides are carried by the frame in vertically spaced position above and below a work supporting table that is pivotally supported on the lower forward portion of the frame. Power for driving the saw band at a selected rate of speed in a high or low range is transmitted from a driving motor by means of a variable speed transmission mechanism that is operatively connected to drive one of the saw guiding wheels.

A full and detailed description of the machine will be found in my abovementioned Patent No. 2,695,637 entitled a Band Sawing Machine. Therefore, only so much of the description of the machine will be given herein as is necessary to disclose my present invention.

The foregoing and other objects of this invention, which will become more fully apparent from the following detailed specification, setting forth the several illustrative embodiments, may be achieved by the particular apparatus constituting an exemplifying embodiment of the invention that is depicted in and described in connection with the accompanying drawings, in which:

Figure 1 is a view in left side elevation of a band sawing machine in which the invention is embodied in practical form, parts of the machine frame having been broken away to show more clearly the unit type construction thereof;

Figure 1A is a fragmentary sectional view along the line 1A—1A of Figure 1;

Fig. 2 is a view in front elevation of the machine including the variable speed driving transmission mechanism and having a part of the housing for the range changing mechanism broken away to show a part of the driving mechanism for the lower saw guiding wheel;

Fig. 3 is an enlarged detailed view in horizontal section through the elevating and clamping mechanism for the upper saw guide taken approximately along the plane represented by the line 3—3 in Fig. 2;

Fig. 4 is a diagrammatic view of a modified form of variable speed transmission mechanism interconnecting the driving motor and the range changing mechanism;

Fig. 5 is an enlarged detailed view in front elevation of the upper and lower saw guides including a fragmentary representation in vertical section of the work supporting table interposed therebetween and taken on a plane represented by the line 5—5 in Fig. 2;

Fig. 6 is an enlarged detailed view in right side elevation of the upper and lower saw guides;

Fig. 7 is a plan view of the upper saw guide showing the individually opposed guide plates in saw guiding engagement;

Fig. 8 is a plan view similar to Fig. 7 showing the outer opposed guide plates in retracted position;

Fig. 9 is a plan view similar to Fig. 7 showing only the innermost opposed guide plates in saw guiding engagement;

Fig. 10 is an enlarged detailed view in front elevation of a pair of adjustable saw guides of modified form;

Fig. 11 is an enlarged view in right side elevation of the modified form of saw guides;

Fig. 12 is a plan view of the upper modified form of saw guide taken on a plane represented by the line 12—12 in Fig. 10;

Fig. 13 is a plan view of the upper modified form of saw guide showing the outer opposed guide plates in retracted position;

Fig. 14 is a plan view of the upper modified form of saw guide showing only the innermost opposed guide plates in saw guiding engagement;

Fig. 15 is a view in vertical transverse section through the range changing transmission mechanism and a part of the lower wheel support;

Fig. 16 is a view in vertical longitudinal section through the range changing transmission mechanism taken on a plane represented by the line 16—16 in Fig. 15;

Fig. 17 is an enlarged view in right side elevation of the lower portion of the machine and showing the modified form of speed changing transmission mechanism shown in Fig. 4; and, Fig. 18 is a view in transverse vertical section of the table support bracket and the table clamping mechanism taken on a plane represented by the line 18—18 of Fig. 17.

Referring more specifically to the drawings, Figs. 1 and 2 thereof in particular show generally in side and front elevation a band sawing machine that is fully described in my Patent No. 2,695,637, entitled Band Sawing Machine. As shown in these views, it may be seen that the machine comprises essentially a generally C-shaped supporting frame 31 of an improved unit type construction that is disposed to rotatably support upper and lower saw guiding wheels 32 and 33 respectively in vertically spaced relationship. The frame 31 defines an open throat 34 constituting a working zone through which a workpiece may be fed to the forward run of a continuous or endless saw band 35 trained about the saw guiding wheels 32 and 33.

To support a workpiece during a sawing operation, there is provided toward the front central portion of the machine a normally horizontal work supporting table 36 carried by the frame 31 in position to define the lower limit of the open throat 34 formed thereby and which is provided with a slotted opening 37 to permit vertical movement of the forward stretch of the saw band 35. Power for driving the saw band 35 at a selected rate of speed in a high or low range is derived from a motor 38 mounted within the lower hollow portion of the machine frame 31 and connected through a speed changer 40 to drive a range changing mechanism 41 which, in turn, is connected to drive the lower saw guiding wheel 33.

In order to guide and guard the saw band 35 in straight line movement through the open throat 34 constituting the working zone, a pair of laminated saw band guides 44 and 45 are carried by the supporting frame 31 in vertically spaced relationship above and below the work supporting table 36 and are disposed to be individually adjustable to accommodate varying widths and thicknesses of saw bands.

As shown in Figs. 1, 17 and 18, the work supporting table 36 is pivotally supported toward the upper forward portion of the lower wheel support 50 for angular adjustment through an arc of approximately 45° from a normally horizontal position. To adjustably support the table 36 for pivotal movement, a bracket 89 perpendicularly secured to the underside of the table 36 is provided with an arcuate slot 90 disposed to engage a pair of horizontal guide pins 91 and 92 extending outwardly from a flat vertical bearing surface 93 formed on the side face of a mounting plate 94 that extends upwardly from the upper forward portion of the lower wheel support 50. The horizontal guide pins 91 and 92, Fig. 17, are so spaced and located with reference to the arcuate slot 90 as to guide the table 36 for pivotal adjustment about an axis formed by the intersection of the horizontal plane of the table surface and the vertical plane of the saw band 35.

A complementary flat bearing surface 96 formed on the inner side face of the table bracket 89 is disposed to be normally retained in frictional guiding engagement with the flat vertical bearing surface 93 formed on the mounting plate 94 secured to the lower wheel support 50 during pivotal adjustment of the table 36. To effect this result, a horizontally disposed stud 97 secured at its inner end to the vertical mounting plate 94 and extending outwardly through the arcuate slot 90 formed in the table bracket 89 is encircled toward its outer end by a spring 98 contained within a cup shaped washer 99 carried by the stud in manner to be interposed between the outer face 104 of the bracket and a locking member 105 threadedly secured to the extreme outer end of the stud. With the locking member 105 in disengaged or unclamped position, as shown in Fig. 18, the spring 98 is disposed to exert pressure between the member 105 and the bracket face 104 in manner to urge the flat bearing surface 96 formed on the inner side thereof into frictional engagement with the vertical guiding surface 93 of the mounting plate 94. The resilient force exerted by the spring 98 is sufficient to retain the table 36 in any selected position of angular adjustment without preventing a further manual adjustment thereof.

To clamp the table 36 immovably to the lower wheel support 50 in a selected position of angular adjustment, the clamping member 105 is operative to engage a peripheral flange 106 integrally formed with the cup shaped washer 99 to urge the table bracket 89 into stationary clamped engagement with the vertical mounting plate 94. Thus, the spring 98 is protected against being fully compressed whenever the clamp member 105 is moved into full clamped position because of the fact that it is fully enclosed within the outwardly extending peripheral flange 106 of the cup shaped washer 99.

To indicate the degree of pivotal adjustment of the table 36, an indicating scale 107 secured to the table bracket 89 is provided with indicia arranged to cooperate with a pointer 108 secured to the mounting plate 94.

To provide clearance for the saw band 35 as the table 36 is angularly adjusted, the table is apertured to receive a circular plate 109, Figs. 1 and 2, which is provided with a slot corresponding to the table slot 37 for permitting vertical movement of the saw band.

As shown in Figs. 1 and 2, the upper saw guide guard 44 and the lower saw guide 45 are respectively carried in vertically spaced relationship toward the front of the machine by the upper and lower wheel supports 49 and 50 and are positioned above and below the machine table 36 in manner to engage the forward stretch of the saw band 35. As shown in Figs. 2, 5 and 6, each of the saw band guides 44 and 45 is of generally similar construction and includes a support block 110 disposed to carry a pair of opposed laminated C-shaped guide members 111 and 112 for independent adjustment toward or away from each other in manner to define a guiding slot of appropriate width and depth to accommodate the band saw blade 35. To guide the stretch of the saw band 35 extending between the guide members 44 and 45 with maximum rigidity for obtaining increased accuracy in a sawing operation, each of the pairs of opposed guide elements 111 and 112 constituting the upper and lower saw guides 44 and 45 respectively, is provided with a pair of inwardly opposed and vertically spaced saw band guiding edges 113 and 114 disposed in parallelism.

The support block 110 of the lower guide member 45 is secured to the outer end of a horizontal rod 115 slidably keyed for lateral adjustment in a bored hole formed in the table mounting plate 94 toward the upper forward portion of the lower wheel support 50 and is arranged to be clamped in predetermined adjusted position by means of a clamp screw 116, as shown in Figs. 1 and 2.

The support block 110 of the upper saw guide 44 is supported for lateral and vertical adjustment at the outer end of a horizontal rod 117 slidably keyed for lateral adjustment in a bracket 118 carried at the lower end of vertically adjustable rod 119 which, in turn, is slidably keyed in a bracket 120 bolted directly to the upper wheel support 49. A clamp screw 123 threaded in the upper bracket 120 is operative to retain the vertical rod 119 in adjusted position and a clamp screw 124 threaded in the lower bracket 118 is operative to retain the horizontal rod 117 in a predetermined position of lateral adjustment.

As shown in Figs. 2 and 3, resilient means operative in conjunction with the clamp screw 123 whenever the clamp screw is in disengaged or unclamped position are arranged to retain the vertical rod 119 in adjusted position without preventing further vertical adjustment thereof. As there shown, the bracket 120 is provided with a horizontally bored hole 125 of reduced diameter that is axially concentric with a threaded hole disposed to receive the clamp screw 123. The clamp screw 123 being of a reduced length disposed to extend only partially through the threaded hole formed in the bracket 120, is provided at its inner end with an axially concentric bored hole arranged to slidably receive an extending pilot rod 127 of reduced diameter that is secured to a plunger 128 slidably carried for axial movement within the bored hole 125 formed in the bracket 120. The plunger 128 is provided with a V-shaped inner end that is disposed to engage a complementary V-shaped longitudinal groove 129 formed in the vertical rod 119.

The plunger 128 is of stepped diameter, having its central portion encircled by a spring 130 that bears at one end against a shoulder 131 formed on the plunger and at its other opposite end against the inner end of the clamp screw 123. With the clamp screw 123 in disengaged or unclamped position, as shown in Fig. 3, the spring 130 is disposed to urge the inner V-shaped end of the plunger 128 into frictional engagement with the V-shaped groove 129 formed on the vertical rod 119 in manner to restrain the rod against downward and pivotal movement. Although the resilient pressure exerted by the spring 130 is sufficient to maintain the rod 119 in vertically adjusted position, it is not great enough to prevent or interfere with the manual vertical adjustment thereof.

To effect a controlling vertical adjustment of the rod 119 for varying the height of the upper saw band guide 44 above the work table 36, as shown in Figs. 1, 2 and 3, a pinion 133 journalled in the bracket to engage rack teeth 134 formed on the rod 119 is connected to be actuated by means of a control handle 135 carried on the outer end of a pinion shaft 136.

To clamp the rod 119 securely to the bracket 120 in a stationary position of vertical adjustment, the clamp screw 123 is selectively movable to engage a shoulder 137 formed by the central portion of the plunger 128 in manner to urge the V-shaped inner end thereof into locking engagement with the V-shaped groove 129 formed in the rod.

As shown in the enlarged views in Figs. 5 and 6, the lower saw band guide 45 is so positioned that the converging narrowed ends of the laminated guide members 111 and 112 carried by the support block 110 extend upwardly into a recess 138 formed in the underside of the table 36. The upper saw band guide 44 is vertically adjustable in manner that the converging narrowed ends of the laminated guide members 111 and 112 carried by the upper support block 110 are brought as close as possible to the upper surface of a workpiece, for example, the workpiece 139 carried by the table 36. Thus, the upper and lower saw guides 44 and 45 are disposed to be positioned as close as possible to the opposite sides of the workpiece 139 carried by the table 36 in manner to guide the saw band 35 and restrain it against both rearward and lateral movement during a sawing operation.

To accommodate varying thicknesses of workpieces, the height of the upper saw guide 44 above the table 36 may be regulated by means of the pinion control handle 135, as shown in Figs. 2 and 3. To permit maximum upward vertical movement of the upper guide 44 for accommodating any size of workpiece that will pass through the open throat 34 constituting the working zone, the upper wheel support 49 is provided at its lower forward corner with a notched out recess 141, Fig. 1, permitting complete retraction of the upper guide.

To enclose that portion of the saw band 35 between the upper saw guide 44 and the upper wheel support 49 for affording continued protection to a machine operation, as shown in Figs. 1 and 2, there is provided a vertical saw guard 142 disposed to extend upwardly from the upper saw guide support block 110. As shown in Figs. 7 and 8, the saw guard 142 is carried for pivotal movement by a vertical pin 143 journalled in the upper block 110. This allows the saw guard 142 to be pivoted into a guarding position or into a parked position when the saw band is being removed from the saw guide 44. A thumb screw 144 threaded in the upper block 110 of the guide 44 is provided to lock the saw guard 142 to the support block in guarding position. The movement of the saw guide guard block 110 closer to or away from the workpiece effects movement of the saw guard 142 the same amount. At all times the saw band blade above the workpiece is guarded to afford protection to the machine operator.

Inasmuch as the saw guides 44 and 45 are of generally similar construction, only the upper guide 44 will be described in detail. As shown in Figs. 5 and 6, the upper support block 110 is provided with a laterally offset recess formed rearwardly of the central portion of the laminated guide members 111 and 112 in manner to receive a rotatable thrust roller 145. The thrust roller 145 is journalled on a stub shaft 146, carried towards one side of the block 110, for rotation in a plane transverse to the plane of the guiding slot formed by the opposed laminated guide members 111 and 112 about an axis which is laterally offset therefrom. Thus, the saw band 35 threaded through the guiding slot defined by the laminated guide members 111 and 112 is restrained against rearward movement by having its rearward edge engage the forward side face of the rotatable thrust roller 145 along a line that is laterally offset from the axis thereof.

Each of the opposed laminated guide members 111 and 112 of the upper guide member 44 is slidably carried for movement toward or away from each other in the same vertical plane on flat vertical bearing surfaces formed on the front face of the support block 110, as shown in Figs. 5, 6 and 7. To limit the degree of lateral adjustment, each of the laminated guide members 111 and 112 is provided with a pair of horizontally elongated slots 147 and 148 respectively arranged to receive clamping bolts 149 and 150 which extend therethrough to threadedly engage the support block 110 and which are operative to clamp the guide members in a selected position of lateral adjustment.

In addition to being laterally adjustable for varying the width of the guiding slot to accommodate different thickness of saw bands, the opposed laminated guide members 111 and 112 are individually adjustable in a manner to vary the depth of the guiding slot formed therebetween for accommodating different widths of saw bands, as shown in Figs. 7, 8 and 9. To effect this result, each of the laminated guide members 111 and 112 is composed of a plurality of slidably superimposed individual guide plates of laminae 152, 153 and 154, formed in such a manner as to present a C-shaped plate. The guide plates or laminae are provided with a pair of horizontally elongated guiding slots 147 and 148, as shown in Fig. 5, arranged to be engaged by the clamp bolts 149 and 150. Each of the individually opposed guide plates 152, 153 and 154 are provided with a pair of vertically spaced, inwardly opposed guiding edges 113 and 114 disposed in parallelism and perpendicular to the plane in which the guide plates are slidable.

To provide a slot of maximum depth for accommodating a comparatively wide saw band 35, as shown in Figs. 5, 6, and 7, each of the individual guide plates 152, 153 and 154 constituting the laminated guide elements 111 and 112 are so positioned that the vertically spaced bearing surfaces 113 and 114 of each guide plate are in the same plane to form continuous full depth bearing surfaces for guiding the saw band. To provide a slot for accommodating a saw band of intermediate width, as shown in Fig. 8, the outer opposed guide plates 154 of the laminated guide members 111 and 112 are retracted from saw engaging position to leave only the inner opposed guide plates 152 and 153 thereof in position to define a saw guiding slot. For guiding a narrow saw band, as shown in Fig. 9, both of the outer opposed guide plates 153 and 154 of the laminated members are retracted to leave only the innermost opposed guide plates 152 thereof in position to define a slot for guiding the saw band.

With my device the straight line guiding effect upon a saw band is extended over a longer length of a saw band than has been heretofore possible and as a result the accuracy of a band saw machine has been improved. The frictional heat which would be engendered by the contact of a solid guiding member of the length of the disclosed device and a rapidly revolving saw band has been minimized by designing the guide plates in such a manner as to have the central portions of the guide plates out of contact from the saw band. Thus, the guiding effect of the device is not effected, while frictional heat is kept to a minimum.

My device also aids in reducing saw band fatigue due to bending stresses and to heat occurring in the area of the greatest stresses. The bending stresses are those set up by the lateral flexure of a saw band and the rearward bending force that is exerted upon saw bands by materials being acted upon. These two stresses cooperate to develop cracks in a saw band which start at the saw teeth root and extend inward into the band portion of the saw band. The additional factor of heat aggravates the effects of the bending stresses. It is therefore apparent that my guides for saw bands as disclosed herein, tends to relieve these conditions in a manner that has not been heretofore possible.

In a modified form of apparatus for guiding a saw band, as shown in Figs. 10 and 11, there are provided a pair of vertically spaced saw band guides 155 and 156 respectively carried by the laterally and vertically adjustable rod 117 and the laterally adjustable rod 115 in vertically spaced positions above and below the work supporting table 36. As there shown, each of the saw band guides 155 and 156 includes a supporting block 157 provided with angularly converging guideways respectively disposed to support a pair of opposed laminated guide members 158 and 159 for slidable adjustable movement towards or away from each other in the same plane.

Each of the opposed laminated guide members 158 and 159 is provided with an elongated slot 160 disposed to receive a clamping screw 163 extending therethrough to threadedly engage the support block for clamping the guide members in predetermined adjusted position and for limiting the longitudinal movement thereof.

To restrain the saw band 35 threaded between the opposed laminated guide members 158 and 159 against rearward movement, the upper saw guide 155 is provided with a thrust roller 164 rotatably carried by the upper support block 157 in a position rearwardly of the guiding slot defined by the opposed guide members 158 and 159. The thrust roller 164 is journalled on an axis lying in a plane approximately parallel to the plane in which the guide members 158 and 159 are movable, for rotation in a plane that angularly intersects the vertical plane of the guiding slot defined by the guide members. This arrangement of the thrust bearing 164 allows for line contact of the rear surface of the saw blade with the periphery surface of the roller, keeping the friction between them at a minimum.

Thus, the saw band 35 restrained against lateral movement by the opposed laminated guide members 158 and 159 will be guided for straight line movement in a plane diagonal to the plane of rotation of the roller 164 and in manner that the rearward edge of the saw band diagonally engages the peripheral rim of the thrust roller.

The lower saw guide 156 may be the same as the upper saw guide 155, however, I prefer to use a modified form using a thrust shoe in place of a thrust roller, as shown in Figs. 10 and 11. The lower saw guide as shown, is provided with a thrust shoe 165 carried by the lower support block 157 in a position rearwardly of the laminated guide members 158 and 159 in manner to engage the rearward edge of saw band 35. A saw band threaded through the upper saw guide 155 and the lower saw guide 156, will be restrained against rearward movement by the rotatable thrust roller 164 carried by the upper support block 157, and by the thrust plate 165 in the lower support block 157.

Each of the opposed laminated saw guides 158 and 159 is composed of a plurality of individual guide plates or laminae 166, 167 and 168 slidably superimposed upon each other for selective individual adjustment in manner to vary the depth of the guiding slot formed therebetween. The separate guide plates 166, 167 and 168 are each provided with an elongated slot 160 disposed to be engaged by the clamping screws 163 and are arranged to have their inner, angular ends disposed in parallelism and in a plane perpendicular to the plane in which the guide plates are movable. As shown in Figs. 12, 13 and 14, the separate guide plates 166, 167 and 168, constituting the opposed laminated guide members 158 and 159 may be so positioned as to define a slot of varying depth for guiding a saw band of wide, intermediate or narrow width, respectively, without removing the guide plates or guide members from the supporting block.

Power for driving the saw band 35 at a selected speed in a high or a low range is derived from the motor 38 which is carried for a relatively slight vertical adjustment on a motor support plate 172 pivotally mounted within the hollow base 39 of the machine, as shown in Figs. 1 and 2. From a multiple grooved, stepped driving pulley 173 keyed to the motor shaft, power is transmitted by means of a belt 174 to drive a stepped pulley 175 rotatably journalled toward the outer end of an independently rotatable transmission shaft 176 journalled in the range changing mechanism 41, as shown in Figs. 2 and 15. The multiple grooved stepped pulleys 173 and 175, together with the power transmitting belt 174, are operative in well known manner to constitute the selectively adjustable stepped speed changer 40.

To facilitate the adjustment of the belt 174 about the stepped pulleys 173 and 175 for selectively varying the driving ratio therebetween, there is provided toward the lower rightward part of the machine, a foot pedal 178 pivotally carried by an outer wall of the machine base 39 in manner to engage with its opposite inner end 179 the underside of the pivotally movable motor support plate 172. Depressing the foot pedal 178 operates to pivot the inner end of the motor plate 172 upwardly which, in turn, effects upward movement of the driving pulley 173 toward the driven pulley 175 for facilitating the manual adjustment of the belt 174 about the pulleys.

To limit pivotal movement of the motor plate 172, as well as to provide a proper driving tension on the belt 174, a vertical stud 180 secured within the base 39 is disposed to engage the outer end of the motor support plate 172. A pair of springs 181 and 182 carried by the stud 180 on the opposite sides of the motor support plate 172 are operable to resiliently limit the pivotal movement thereof.

The range changing mechanism 41 is contained within a housing 183 secured at its inner side to a hollow cylindrical housing 184 integrally formed with and extending laterally outward from the lower wheel support 50 by means of cap screws 185, Fig. 15. The underside of the housing 183 is supported upon the upper surface of the hollow base 39 by means of a jackscrew 186 interposed therebetween.

The range changing mechanism 41 shown in Figs. 2 and 15 comprises essentially a pair of clutches 187 and 188 selectively actuatable to transmit power from the stepped driven pulley 175 to rotate the saw driving transmission shaft 176 at a selected speed in a high or a low range. The saw driving transmission shaft 176 is journalled toward its outer end to rotate in a bearing 189 carried by an outboard support 190 bolted directly to the housing 183 and at its inner end in a pair of axially spaced bearings 192 and 193 carried within the circular housing 184 secured to the lower wheel support 50. At its extreme inner end, the transmission shaft 176 is provided with a slight taper 194 corresponding with a complementary tapered bore formed in the hub 195 of the lower saw guiding and driving wheel 33. The lower guiding wheel 33 is keyed to the inner tapered end 194 of the shaft 176 and secured thereto by means of a lock washer 196 and a cap screw 197 for rotation within the housing formed by the lower wheel support 50.

The range changing clutches 187 and 188 respectively are provided with hollow circular outer housings 198 and 199 respectively connected to be driven throughout high and low speed ranges. The high range clutch housing 199 is provided with an outwardly extending, elongated hub 202 integrally formed therewith and is journalled to rotate on the rightward end of the transmission driving shaft 176 on sleeve bearings 203 and 204. For driving the rightward clutch housing 199 in a high range, the upper multiple groove pulley 175 is keyed directly to the elongated hub 202 integrally formed therewith.

The clutch housing 198 of the low range clutch 187 is provided with an extending hub 205 of reduced diameter that is journalled to rotate on the central portion of the transmission driving shaft 176, on sleeve bearings 206 and 207. For transmitting power from the pulley 175 to drive the clutch housing 198 at a reduced range of driving speeds, a pinion 208 keyed to the hub 202 of the rightward high range clutch housing 199 is operatively connected to engage an enlarged spur gear 209 secured to a jackshaft 210 which is, in turn, journalled to rotate in the lower portion of the housing 183. A pinion 211 secured to the opposite end of the jackshaft 210 is disposed to engage gear teeth 212 formed on the periphery of the low range clutch housing 198.

To transmit power from the leftward clutch housing 198 for driving the transmission shaft 176 in the low range, an inner clutch element 214 keyed to the shaft 176 is provided with driven clutch plates 215 arranged to be engageable with driving clutch plates 216 slidably keyed at their outer periphery within the clutch housing 198. A cover plate 217 secured to the clutch housing 198 by means of cap screws is threaded to receive a rotatable adjusting element 219 disposed to be retained in adjusted position by means of a lock screw 220. Toward its inner, forward portion, the adjusting element 219 is provided with an outwardly inclined circular guideway 221 arranged to guide a plurality of actuating balls 222, circumferentially spaced about the inner clutch element 214, for outward movement into wedging engagement with a clutch actuating plate 223 to effect driving engagement between the driving clutch plates 216 and the driven clutch plates 215.

In a similar manner, the rightward high range clutch 188 is provided with a plurality of driving clutch plates 225 and driven clutch plates 226 selectively engageable to transmit power from the outer clutch housing 199 to drive the transmission shaft 176. A plurality of clutch actuating balls 227 are retained in circumferentially spaced relationship about an inner clutch element 228 by an outwardly inclined circular guideway formed at the inner beveled edge of a circular adjusting element 230 carried in a clutch cover plate 231 whenever the high range clutch 188 is disengaged, as shown in Fig. 15.

To effect selective engagement of the clutch 187 or the clutch 188, there is provided intermediately of the clutches an actuating sleeve 232 slidably carried on the transmission shaft 176 for axial movement. Adjacent to its oppositely beveled ends, the actuating sleeve 232 is provided with a pair of ball races 233 and 234 respectively disposed to be engaged by the clutch actuating balls 222 or 227. As the sleeve 232 is moved leftwardly to effect engagement of the low range clutch 187, the beveled or tapered leftward end thereof operates to move the actuating balls 222 outwardly to exert pressure between the angularly inclined circular guideway 221 of the adjusting element 219 and the axially slidable clutch actuating plate 223. With the sleeve 232 moved to its limit of leftward movement, the actuating balls 222 will be seated in the ball race 233, as shown in Fig. 15, in which position the balls will function in a manner similar to a detent mechanism for retaining the sleeve in its leftward position and thus maintaining the clutch plates 215 and 216 in driving engagement.

In a similar manner, the actuating sleeve 232 is axially movable to its extreme rightward position to effect a driving engagement between the clutch plates 225 and 226 of the high range clutch 188. In the event neither of the clutches 187 and 188 is to be engaged, the actuating sleeve 232 is movable to a central neutral position intermediately of the clutches, as shown in Fig. 2.

For effecting selective axial movement of the actuating sleeve 232 in either direction from its neutral position, Fig. 2, to effect engagement of either the low range clutch 187 or the high range clutch 188, there is journalled on the upper surface of the range changing housing 183 a control lever 235. The control lever 235 is secured to the outer end of a vertical shaft 236 journalled to rotate in a support bracket 237 secured to the upper surface of the housing. At its inner end, as shown in Figs. 15 and 16, the vertical shaft 236 is provided with an eccentric arm 238 disposed to engage the upper end of a laterally pivotable shifter fork 239 pivotally carried between a pair of spaced arms 240 and 241 depending from the underside of the bracket 237. The lower forked end of the shifter fork 239 engages an annular groove 242 formed on the central portion of the axially slidable clutch actuating sleeve 232.

Referring now to Figs. 4 and 17, the modified form of a speed changing mechanism 244 there shown is interposed between the motor 38 and the range changing mechanism 41 for transmitting power therebetween to drive the continuous saw band 35 throughout an infinitely variable selection of speeds in a high and low range. The infinitely variable speed changing transmission mechanism 244 comprises essentially an intermediate pulley unit 245 of the expansible variable pitch type rotatably carried toward the outer end of one arm 246 of a movable bell crank 247 which, in turn, is pivotally supported by the machine base 39. A driving pulley 248 keyed to the shaft of the motor 38 and a driven pulley 249 keyed to the outwardly extending hub 202 of the hub range clutch housing 199 are rotatable in a plane parallel to the plane of rotation of the intermediate pulley unit 245 and are interconnected therewith by means of a lower driving belt 250 and an upper driving belt 251, respectively.

The intermediate pulley unit 245 is provided with an axially floating center section 252 which is slidably keyed on a pulley hub 253 for movement between a pair of fixed end sections 254 and 255 secured to the opposite ends thereof in well known manner. The lower driving belt 250 is trained about the lower motor pulley 248 and a groove 256 of variable diameter formed between the axially floating center section 252 and the leftward end section 254 of the intermediate pulley unit 245. In a similar manner, the upper driven belt 251 is trained about the upper pulley 249 and a groove 257 of variable diameter formed between the movable center section 252 and the rightward end section 255 of the pulley unit 245. Bodily downward movement of the intermediate pulley unit 245 operates in well known manner through the action of the cooperating belts to effect leftward movement of the axially movable center section 252 thereof to increase the effective driving diameter of the pulley groove 256 and to decrease the driving diameter of the groove 257 for decreasing the rate of speed of the driven pulley 249. Conversely, upward movement of the intermediate pulley unit 245 operates through the action of the cooperating belts to increase the speed of the driven pulley 249.

To effect selective upward or downward movement of the intermediate pulley unit 245, the bell crank 247 is forked at its opposite end in manner to engage a circular pilot 258 secured to a traveling adjusting nut 259 threaded on the inner end of an adjusting screw 260. The adjusting screw 260 is journalled to rotate in an extending arm 261 secured to the machine base 39 and is provided at its outer end with a handwheel 262 which is operative to rotate the shaft for effecting selective longitudinal movement of the adjusting nut 259 in manner to move the bell crank for effecting upward or downward bodily movement of the intermediate pulley unit 245.

From the foregoing description and explanation of the construction and operation of the saw guide and guard herein set forth as exemplifying the invention, it is apparent that there has been provided an improved, economically constructed and simple operating unit type saw guide and guard. Although the invention has herein been described in detail for the purpose of setting forth a practical apparatus, it is to be understood that the particular device is intended to be illustrative only and that the various inventive features may be incorporated in other structural forms and may be applied to other types of machines without departing from the spirit and scope of the invention as defined in the subjoined claims.

The principles of the invention having now been fully explained in connection with the foregoing description of embodying structure, I hereby claim as my invention:

1. In a band sawing machine, a frame including a substantially rectangular upper wheel support having a peripheral flange, an upper saw guiding wheel rotatably carried by said support within the protective flange formed therewith, a cover hinged to said support in a manner to cooperate therewith to constitute a hollow protective enclosure for said wheel, said wheel support being provided in its lower peripheral flange with a pair of spaced apart openings adapted to receive the rearward and forward stretches of a saw band trained about said wheel, a lower saw guiding wheel journalled in said frame in parallel spaced relationship beneath said upper wheel, a continuous saw band trained about said lower and upper saw guiding wheels, a guide rod movably secured to the outer face of said wheel support for selective vertical adjustment, a support member movably secured to the lower end of said guide rod for horizontal movement in a plane parallel to the plane of movement of the forward stretch of said saw band, a support block secured to said support member, saw band guide means adjustably carried by said support block for selective horizontal movement therewith into guiding engagement with the forward stretch of said saw band, an upwardly extending guard pivotably supported by said support block for pivotable movement about an axis parallel to the forward band saw stretch for movement between an inoperative position and a guarding position to encompass the cutting edge of said saw band, means carried by said support block for clamping said guard member in its guarding position encompassing the cutting edge of said saw band, said guard member extending upwardly within the front opening formed in the lower peripheral flange of said upper wheel support and cooperating with said upper wheel support and said cover to enclose the cutting edge of the upper portion of the forward stretch of said saw band extending tangentially downward from said upper saw guiding wheel, said guard and said guide means being vertically movable upon vertical movement of said guide rod, said guard and said guide means being transversely movable relative to said guide rod, and clamping means respectively connected to clamp said guide rod in a selected position of vertical adjustment and to clamp said support rod in a selected position of horizontal adjustment.

2. In a band sawing machine, a frame, an upper wheel housing carried by said frame and comprising a flat support plate integrally formed with a perpendicularly extending peripheral flange, a pair of spaced apart openings formed in the lower flange presented by said housing to enclose the forward and return stretches of a saw band, an upper saw guiding wheel journalled within the partial enclosure constituted by said flanged housing, a depending support block movably suspended beneath said housing for a selective vertical and horizontal positioning movement, adjustable saw guide means carried by said support block, an upwardly extending saw guard pivotably secured to the upper surface of said support block for pivotal movement about a vertical axis into saw guarding position, said guard being disposed to telescope upwardly within the one of the flange openings presented by said housing to enclose the forward stretch of a saw band extending tangentially downward from said upper saw guiding wheel, and a hinged cover secured to said housing to cooperate therewith to form a protective enclosure for said saw guiding wheel and in a manner that said saw guard is constrained by said cover against pivotal movement out of saw guarding position when the cover is closed.

3. In an apparatus for effecting vertical adjustment of a saw band guide, a vertical guide rod having rack teeth and presenting a longitudinal groove, a carrier disposed to slidably support said guide rod for vertical adjustment, a pinion journalled in said carrier disposed to engage the said rack teeth formed on said guide rod and arranged to be rotatable for effecting a selective vertical adjustment of said guide rod, a guide shoe movably carried by said carrier disposed to normally engage the said groove in said guide rod in a manner to prevent rotational movement thereof, a clamp element movably supported by said carrier disposed to operatively engage said guide shoe, said clamp element being operable to urge said guide shoe into locking engagement with said guide rod in a manner to retain said guide rod in a stationary non-movable position relative to said carrier, resilient means interconnecting said clamp element and said guide shoe in a manner to exert sufficient frictional braking action therebetween to retain said guide rod in vertically adjusted position and to permit a further vertical adjustment thereof in opposition to the braking action exerted by said resilient means, a horizontal rod slidably carried toward the lower end of said guide rod for transverse adjustment relative to said guide rod in a horizontal plane, a support block secured to the outer end of said horizontal rod, saw guide means adjustably carried by said support block for horizontal movement therewith and in guiding engagement with a saw band, an upwardly extending guard pivotally carried by said support block for movement about a vertical axis, said guard being pivoted into guarding position relative to a straight stretch of a saw band guided by said guide means, said pivotable guard being horizontally movable with said support block, and separate clamping means respectively connected to clamp said horizontal rod in a selected position of horizontal adjustment and to clamp said guard in guarding position whereby both said guard and said guide are positionable conjointly by movement of said support block.

4. In a band saw having a pair of saw band guiding wheels journalled about spaced parallel axes and a continuous saw band entrained over said wheels, a saw band guide, a support for said guide, means mounting said support for rectilinear movement both in the direction of movement of and in a path normal to the direction of movement of the saw band in the plane of its forward stretch between said wheels, and a guard mounted on said support and extending from and movable with said guide toward one of said guide wheels whereby the portion of the forward stretch of said saw band between said one wheel and said guide is closely guarded irrespective of the adjusted position of said guide.

5. In a band saw having upper and lower saw band guiding wheels journalled about vertically spaced parallel axes in vertically spaced hollow housing portions defining a work receiving throat therebetween and a continuous saw band entrained over said wheels, said housing portions each including a movable part which may be moved from its normal position relative to the remainder thereof enclosing the wheel therein to permit installation or removal of said band, an upper saw band guide, a support for said guide, means mounting said support on said remainder of the upper of said housing portions for vertical and horizontal movement in a path parallel to the plane of the forward stretch of said saw band and a guard pivotally mounted about a vertical axis on said guide support in interlocking relation with said upper housing portion remainder and said upper housing portion movable part when in its normal position whereby the portion of the forward stretch of said band above said guide is closely guarded irrespective of the adjusted vertical or horizontal position of said guide so long as the movable part of the upper housing portion is in its normal position.

6. In a band saw having upper and lower saw band guiding wheels journalled about vertically spaced parallel axes in vertical spaced hollow housing portions defining a work receiving throat therebetween and a continuous saw band entrained over said wheels, said housing portions each including a movable part which may be removed from its normal position relative to the remainder thereof to permit installation and removal of said band, an upper saw band guide, a support for said guide, means mounting said support for vertical movement in a path parallel to the plane of the forward stretch of said saw band, and a guard pivotally mounted on said support for movement about a vertical axis from and to a blade guarding position and extending upwardly from said guide into the upper of said housing portions where the parts thereof unite when the movable part is in normal position whereby the portion of the forward stretch of said band is guarded irrespective of the adjusted vertical position of said guide so long as said upper housing portion part is in its normal position.

7. The combination defined in claim 4 wherein said guide comprises a pair of laminated guide members disposed in parallelism carried by said guide support and arranged to be so positionable that the opposed edges thereof operate to form a slot for guiding the forward stretch of said saw band, an equal number of slidably superimposed laminae constituting each of said laminated guide members and disposed on said guide support to be separately adjustable in a manner that the thickness of the opposed blade engaging edges of said guide members may be selectively varied to accommodate saw blades of varying widths, means for guiding said laminae during adjustment, and means for securing said guide members to said guide support in a selected position of adjustment.

8. The combination defined in claim 7 wherein each of said laminae is formed with a pair of coplanar saw guiding surfaces separated by an interconnecting portion terminating in an edge disposed in assembly outwardly from the saw blade relative to said coplanar surfaces whereby the path of movement of the saw blade is guided over a substantial length to assure accuracy in cutting with minimum surface contact between the guide and blade to prevent overheating of the blade.

References Cited in the file of this patent

UNITED STATES PATENTS

| | | |
|---|---|---|
| 104,770 | Richards et al. | June 28, 1870 |
| 405,110 | McChesney | June 11, 1889 |
| 425,105 | McChesney | Apr. 8, 1890 |
| 450,871 | Plumridge et al. | Apr. 21, 1891 |
| 459,600 | Striegel | Sept. 15, 1891 |
| 496,178 | Wright | Apr. 25, 1893 |
| 567,319 | Mershon | Sept. 8, 1896 |
| 729,200 | Miller | May 26, 1903 |
| 776,272 | Towsley | Nov. 29, 1904 |
| 788,907 | Hoops | May 2, 1905 |
| 1,059,400 | Seberg | Apr. 22, 1913 |
| 1,435,997 | Wallace | Nov. 21, 1922 |
| 1,841,939 | De Koning et al. | Jan. 19, 1932 |
| 2,180,079 | Wilkie | Nov. 14, 1939 |
| 2,274,923 | Hedgpeth | Mar. 3, 1942 |
| 2,311,426 | Wilkie | Feb. 16, 1943 |
| 2,320,713 | Brotman | June 1, 1943 |
| 2,347,764 | Boice et al. | May 2, 1944 |
| 2,384,364 | Boice et al. | Sept. 4, 1945 |
| 2,406,417 | Viviano | Aug. 27, 1946 |
| 2,576,090 | Krause | Nov. 27, 1951 |
| 2,604,126 | Wiken et al. | July 22, 1952 |
| 2,627,288 | Steiner | Feb. 3, 1953 |
| 2,652,863 | Grabinski | Sept. 22, 1953 |
| 2,664,118 | Krumbach | Dec. 29, 1953 |
| 2,684,697 | Ferrari | July 27, 1954 |
| 2,695,637 | Ocenasek | Nov. 30, 1954 |